Oct. 30, 1945.
J. M. GARRIGA
2,387,726
FILTERING MEDIUM
Filed May 18, 1943
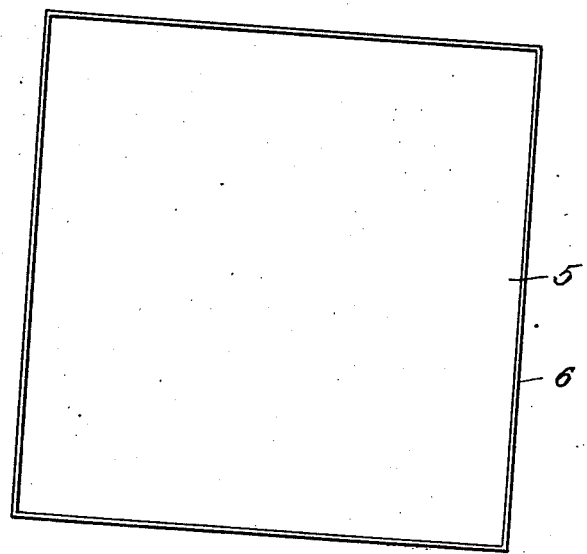
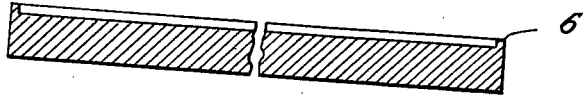
INVENTOR.
Jose M. Garriga
BY
ATTORNEYS Patented Oct. 30, 1945

2,387,726

UNITED STATES PATENT OFFICE 2,387,726

FILTERING MEDIUM

José M. Garriga, Lima, Peru, assignor to Corporacion Peruana del Amazonas, Lima, Peru, a corporation of Peru Application May 18, 1943, Serial No. 487,493
In Peru December 9, 1942

2 Claims. (Cl. 210—205)

This invention relates to the treatment of latex extracted from *Hevea brasiliensis*, Castilla and similar elastic gum-producing trees.

The oldest process for the coagulation of latex, still in use throughout South America, consists in pouring latex over a rotating mandrel exposed to the action of smoke generated by the combustion of uricuri seeds, the coagulation being effected by the evaporation of the liquid and the curing effect of the smoke. In this procedure, the latex solidifies in thin layers around the mandrel, the resulting product resembling roughly the shape of a ball.

This procedure is objectionable for many reasons. The coagulation requires much time, and the operators are subjected to smoke and heat, both of which are particularly objectionable in a tropical climate. The water content, as well as the impurities which accumulate in the rubber ball during the process, detract from its commercial value. The average amount of impurities which must be eliminated is about 22%. The rubber as produced in the field is not immediately adapted to manufacturing requirements and must be subjected to further treatment such as rolling under the action of water, ordinarily called washing, requiring special equipment and considerable labor. In any event, the cost of the rubber is increased by transportation of a considerable percentage of waste material therein. The shape of the rubber ball is also objectionable from the point of view of efficient utilization of shipping space.

A more modern method of treating latex consists in coagulation by means of acid solutions containing citric, formic, acetic and other acids to separate the gums and other elastic elements constituting rubber from the liquid constituents of the latex. After the initial treatment, the liquids are removed by subjecting the mass to the action of rollers of different types, and the product is finally cured by smoke as in the earlier method.

Methods involving the use of acids are complicated and are subject to other objections, for example cost of chemicals, transportation of the same through the jungle, possibility of using wrong concentrations of the acids thus injuring the product, and requirement for equipment in the shape of rolls, trays, etc. Moreover, the method fails to eliminate objectionable moisture which may be trapped in the sheets during the formation thereof.

It is the object of the present invention to provide a simple and effective procedure for the coagulation of latex which does not require the use of acids or other chemicals or of complicated apparatus for handling such materials and is capable of producing sheets free from water and other impurities with the minimum labor cost.

Other objects and advantages of the invention will be apparent as it is better understood by reference to the following specification and accompanying drawing, in which Fig. 1 is a plan view of the simple apparatus employed in the practice of the method; and Fig. 2 is a longitudinal section therethrough.

According to the present invention, the separation of water and other undesirable liquid components of the latex is obtained by combining filtration and evaporation. By this procedure the gum constituents of the latex can be readily separated and recovered without the use of any chemical reagents or the use of smoke. Evaporation is effected by exposing a relatively thin layer of latex to the atmosphere. In countries where latex is produced, the normal heat of the atmosphere is sufficient to promote evaporation. Filtration is accomplished by utilizing as a support for the thin layer of latex a porous body of such quality with respect to porosity that the gum constituents are retained while water and other liquids present pass through the filter bed. An apparatus suitable for the practice of the invention, as illustrated in the drawing, comprises a bed 5 in the form of a slab approximately ⅜ of an inch thick and of any desired lateral dimensions. The slab is surrounded on its upper face by a border 6 about ¹⁄₁₆ of an inch in height, thus affording a shallow mold for the liquid latex. The liquid latex may be poured into the mold and exposed therein to evaporation under natural conditions, that is, the effect of the surrounding atmosphere at the prevailing temperature. Meanwhile, the removal of liquids is augmented by the filtering effect under the action of gravity, the moisture passing through the slab, thus leaving the gums on the surface thereof. As the result of this operation, I am able to coagulate latex rapidly and effectively to secure rubber in the form of sheets suitable for shipment to the market.

The filtering slab may be made of any suitable material which will provide the necessity porosity and does not affect the latex chemically. A satisfactory filtering slab may be made of a mixture of 10 parts by weight of ordinary Portland cement, 485 parts by weight of calcined gypsum (commercial plaster of Paris) and 5 parts by weight of commercial talcum powder. The ingredients are mixed with 580 parts by weight of water, forming a thick paste which is poured into a mold and allowed to harden for forty-eight hours or more. The composition described is merely illustrative, as obviously other compositions may be employed to secure similar results.

Although in its simplest form the filter consists of a slab as described, the invention may be embodied in different forms of apparatus, as for example in the form of a cylindrical or spherical surface or a combination thereof. Moreover, the application of vacuum or pressure in accordance with well known principles of filtration may be utilized, if desired, to promote the rapidity of separation of the water and other liquid constituents of the latex. The invention is not limited, therefore, to the simple filtering element described but comprehends a procedure in which removal of water and other liquids from latex is effected by filtration.

In order to prevent the gum from adhering to the slab or other filtering surface, various compounds may be used. For example, a solution of 75 parts of ordinary laundry soap in 250 parts of water by weight may be smeared over the surface of the filter before the latex is applied thereto. Other cheap and effective compounds for this purpose are available.

Various changes may be made in the procedure and in the apparatus as described without departing from the invention or sacrificing the advantages thereof.

I claim:

1. A porous hardened filtering medium for separating the liquid constituents from the gum constituents of latex, comprising a major proportion of calcined gypsum and minor proportions of Portland cement and talcum powder.

2. A porous hardened filtering medium for separating the liquid constituents from the gum constituents of latex, comprising a major proportion of calcined gypsum and minor proportions of Portland cement and talcum powder in approximately the ratio of 485:10:5 parts by weight.

JOSÉ M. GARRIGA.